US008972242B2

United States Patent
Hao et al.

(10) Patent No.: US 8,972,242 B2
(45) Date of Patent: Mar. 3, 2015

(54) VISUAL ANALYSIS OF PHRASE EXTRACTION FROM A CONTENT STREAM

(75) Inventors: Ming C. Hao, Palo Alto, CA (US);
Christian Rohrdantz, Constance (DE);
Lars-Erik Haug, Gilroy, CA (US);
Umeshwar Dayal, Saratoga, CA (US);
Meichun Hsu, Los Altos Hills, CA (US);
Daniel Keim, Steiβlingen (DE)

(73) Assignee: Hewlett-Packard Development Company, L.P., Houston, TX (US)

( * ) Notice: Subject to any disclaimer, the term of this patent is extended or adjusted under 35 U.S.C. 154(b) by 317 days.

(21) Appl. No.: 13/563,647

(22) Filed: Jul. 31, 2012

(65) Prior Publication Data

US 2014/0039875 A1 Feb. 6, 2014

(51) Int. Cl.
*G06F 17/27* (2006.01)
(52) U.S. Cl.
USPC ............................... 704/9; 704/251; 704/257
(58) Field of Classification Search
USPC ..................... 704/1–10, 251, 255, 257, 270
See application file for complete search history.

(56) References Cited

U.S. PATENT DOCUMENTS

| 7,689,557 | B2 | 3/2010 | Pandit et al. |
| 8,423,551 | B1* | 4/2013 | Ben-Artzi et al. ............ 707/737 |
| 2006/0229865 | A1* | 10/2006 | Carlgren et al. ................. 704/8 |
| 2009/0307207 | A1* | 12/2009 | Murray ............................ 707/5 |
| 2011/0041080 | A1 | 2/2011 | Fleischman et al. |
| 2013/0054597 | A1 | 2/2013 | Hao et al. |
| 2013/0124192 | A1* | 5/2013 | Lindmark et al. ............... 704/9 |

OTHER PUBLICATIONS

Zhang et al., "Visual Analytics and Interactive Technologies," Mar. 14, 2012, 363 p.
Chen et al., "Visual Analysis of Conflicting Opinions," IEEE Symposium on Visual Analytics Science and Technology, Oct. 31, 2006-Nov. 2, 2006, 8 p.
Fu et al., "Analysis and Visualization of Time Series Data from Consumer-Generated Media and News Archives," WI-IATW '07 Proceedings of the 2007 IEEE/WIC/ACM International Conferences on Web Intelligence and Intelligent Agent Technology—Workshops, pp. 259-262.
Mejova, Y., "Sentiment Analysis: An Overview," Nov. 16, 2009, 34 p.

* cited by examiner

*Primary Examiner* — Huyen X. Vo
(74) *Attorney, Agent, or Firm* — Conley Rose, P.C.

(57) ABSTRACT

A system may include an extraction engine to extract candidate phrases from a content stream, and an analysis engine to assign the candidate phrases visual cues and display the visual cues to an operator.

18 Claims, 7 Drawing Sheets

VISUAL ANALYSIS OF PHRASE EXTRACTION FROM A CONTENT STREAM

BACKGROUND

There are many publicly or privately available user generated textual content streams. Many of these content streams contain text information relevant to commercial endeavors, such as products, services, retailers, and events. The content streams may contain, for example, the opinions of the users.

BRIEF DESCRIPTION OF THE DRAWINGS

For a detailed description of various examples, reference will now be made to the accompanying drawings in which.

DETAILED DESCRIPTION

NOTATION AND NOMENCLATURE: Certain term are used throughout the following description and claims to refer to particular system components. As one skilled in the art will appreciate, component names and terms may differ between commercial and research entities. This document does not intend to distinguish between the components that differ in name but not function.

In the following discussion and in the claims, the terms "including" and "comprising" are used in an open-ended fashion, and thus should be interpreted to mean "including, but not limited to . . . ."

The term "couple" or "couples" is intended to mean either an indirect or direct electrical connection. Thus, if a first device couples to a second device, that connection may be through a direct electrical connection, or through an indirect electrical connection via other devices and connections.

As used herein the term "network" is intended to mean interconnected computers, servers, routers, other hardware, and software, that is configurable to produce, transmit, receive, access, and process electrical signals. Further, the term "network" may refer to a public network, having unlimited or nearly unlimited access to users, (e.g., the internet) or a private network, providing access to a limited number of users (e.g., corporate intranet).

A "user" as used herein is intended to refer to a single person that operates a device for the purpose of accessing a network.

The term "message" is intended to mean a sequence of words created by a user at a single time that is transmitted and accessible through a network. A message includes audio or voice data that is transferred to text format. Generally, a message contains textual data and meta-data. Exemplary meta-data includes a time stamp or time of transmitting the message to a network.

The term "content stream" as used herein is intended to refer to the plurality of messages transmitted and accessible through a network during a predetermined period.

A "phrase" as used herein is a series of words in a content stream, that co-occur in messages with a statistically high-frequency. A phrase includes at least two words.

Also, as used herein the term "operator" refers to an entity or person with an interest in the subject matter or information of a content stream.

As used herein, the term "sentiment" relates to the attitude or emotion of a message. The sentiment is determined by an algorithm.

The term "metric" as used herein is used to refer to an algorithm for extracting subject matter or information from a content stream. Metrics include predetermined search parameters, operator input parameters, mathematical equations, and combinations thereof to alter the extraction and presentation of the subject matter or information from a content stream.

OVERVIEW: As noted herein, content streams distributed on various networks contain information relevant to various endeavors, such as products, services, retailers, events, entertainment, and leisure. The content streams are user generated and may contain general broadcast messages, messages between users, messages from a user directed to an entity, and other messages. In certain instances, the messages are social media messages broadcast and exchanged over a network, such as the internet. In other instances, the messages are feedback or commentary provided by users for a commercial endeavor. Generally, the content streams are textual, however they may also comprise of audio and graphical content. Additionally, the content stream may contain content that has been converted from one media such as audio-visual to textual conversion.

A content stream may include hundreds of messages or in some circumstances, such as large events, many millions of messages. Although portions of the content stream may be collected and retained by certain collection tools, such as a content database, the volume of messages in a content stream make analysis, for example by relevance and sentiment, a difficult and time consuming task for a person or organization of people. Additionally, the constant addition of messages to content streams complicates analysis.

In implementations where a content stream contains users' opinions and sentiments that are relevant to a business, product, or event, analyzing a content stream for messages related to the users' opinions and sentiments provides managers or organizers with feedback that may be a tool in evaluation and strategic planning for future products and events. The opinions and sentiments in the user-generated content stream may be particularly relevant and/or useful if the users are clients, customers, or potential customers that have directly provided feedback, for example in a business application feedback form. In certain implementations, identifying common subject matter within the user's opinions and sentiments in a content stream is useful for an endeavor. Further, identifying frequently co-occurring terms within the content stream assists in identifying concepts that are important to the users generating the content stream. Additionally, in implementations displaying the content to an operator according to visual cues of the importance and sentiment provides an analytical method.

SYSTEM: In accordance with various implementations, a system can be configured to extract and analyze user sentiment from a content stream. The system may consult a configurable database for the metrics that are available for use in analyzing the user sentiment from a content stream prior to, during, or after extraction. The metrics and algorithms that populate the database themselves may be readily configurable by an operator prior to or during extraction and analysis operations. Thus, by altering a metric an operator provides themselves with a different result or different set of extracted and analyzed information from the user generated content stream. The system, made up of the database with metrics, algorithms that dictate the analysis of the information, and the presentation of the analyzed date may be considered a series of engines in an analysis system.

Figure 1:
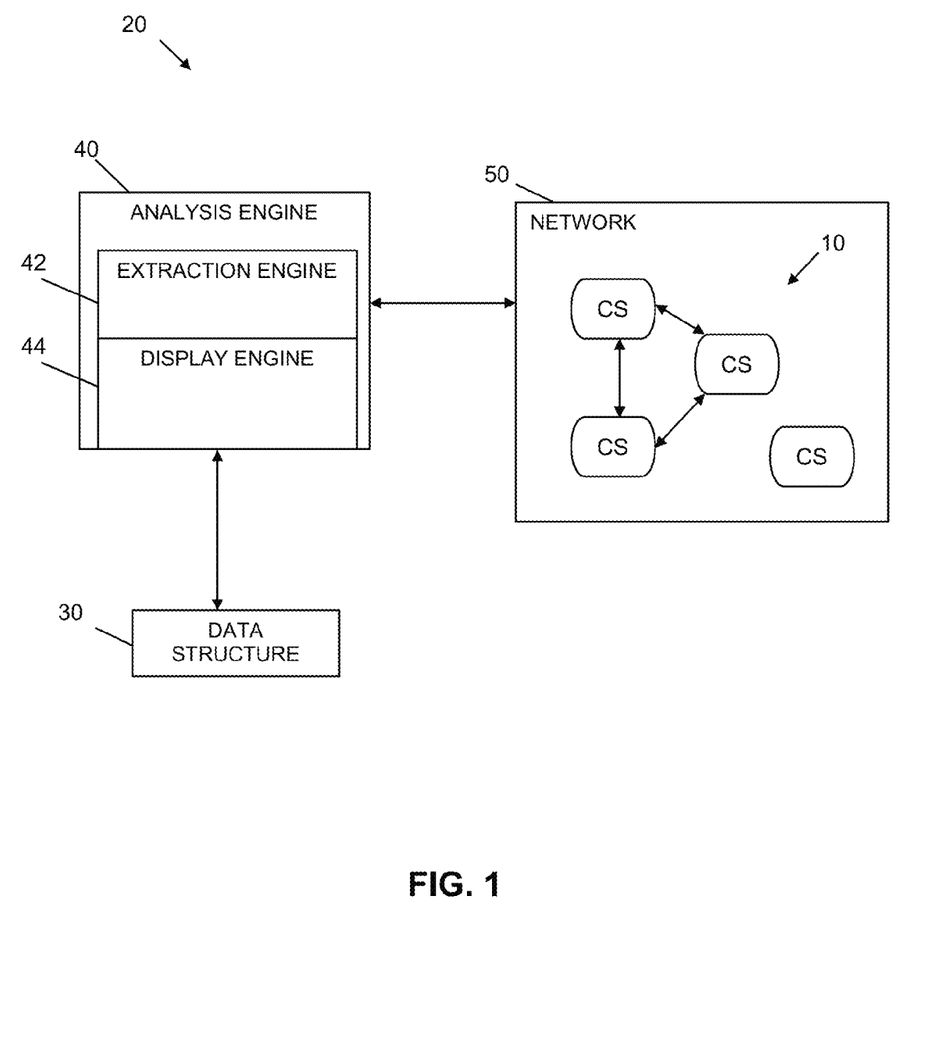
FIG. 1 shows a system in accordance with an example.

FIG. 1 shows a system 20 in accordance with an example including a data structure 30, an analysis engine 40, and a network 50. The network 50 includes various content streams (CS) 10. Generally, the network 50 is a publicly accessible network of electrically communicating computers, such as but not limited to the internet. In certain instances, the content stream 10 may be on a limited access or private network, such as a corporate network. Some of the content streams 50 may be coupled or linked together in the example of FIG. 1, such as but not limited to social media streams. Other content streams 10 may be standalone, such as user input comments or reviews to a website or other material. In some implementations, certain content streams 10 are stored by the data structure 30 after accessing them via the network 50. Each content stream 10 represents a plurality of user generated messages.

In system 20, the analysis engine 40 in the system analyzes the content streams 10 obtained from the network 50 and presents results to an operator. The analysis engine 40 includes an extraction engine 42 for extracting and parsing the content streams from the network. Generally, the analysis engine 40 extracts sentences from messages in a content stream and parses them into at least two-word candidate phrases. Additionally, the analysis engine 40 includes a display engine 44 for organizing and displaying the extracted content streams. The analysis engine 40 determines the importance of the candidate phrases, the sentiment of the candidate phrases, and assigns a visual cue for display to an operator. In instances, the analysis engine 40 displays the visual cues in statistically related groups.

In implementations, the data structure 30 provides the analysis engine 40 operational instructions. Further, information stored in the data structure 30 includes one or more metrics utilized in operation of the analysis engine 40. The one or more metrics may be changeable by an operator of the system 20. The changeable metrics enable the operator to alter the process and presentation of results prior to, during, or after operation. The metrics, including how they are used, how they are changed, and how the results are presented to an operator, are described hereinbelow. The process may include determining content streams 10 that are available on the network 50.

Figure 2:
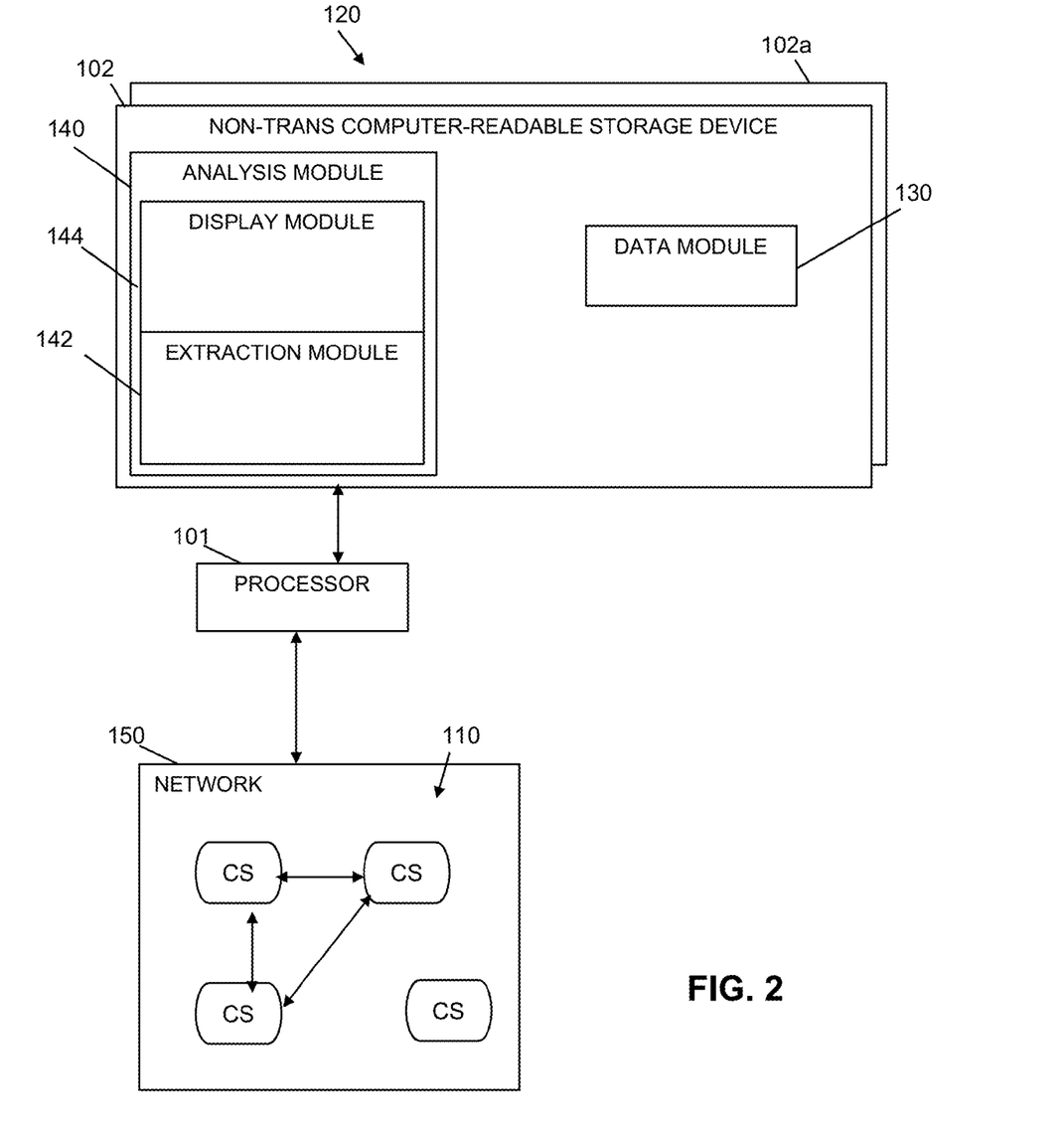
FIG. 2 also shows a system in accordance with an example.

In some implementations, the analysis engine 40 may be implemented as a processor executing software. FIG. 2 shows an illustrative implementation of a processor 101 coupled to a storage device 102, as well as the network 150 with content streams 110. The storage device 102 is implemented as a non-transitory computer-readable storage device. In some examples, the storage device 102 is a single storage device, while in other configurations the storage device 102 is implemented as a plurality of storage devices (e.g., 102, 102a). The storage device 102 may include volatile storage (e.g., random access memory), non-volatile storage (e.g., hard disk drive, Flash storage, optical disc, etc.), or combinations of volatile and non-volatile storage, without limitation.

The storage device 102 includes a software module that corresponds functionally to each of the engine of FIG. 1. The software module may be implemented as an analysis module 140 having an extraction module 142, and a play module 144.

Thus each engine 40-44 of FIG. 1 may be implemented as the processor 101 executing the corresponding software module of FIG. 2.

In implementations, the storage device 102 shown in FIG. 2 includes a data module 130. The data module 130 is accessible by the processor 101 such that the processor 101 is configured to read from or write to the data module 130. Thus, the data module 30 of FIG. 1 may be implemented by the processor 101 executing corresponding software modules 140-144 and accessing information obtained from the corresponding data module 130 of FIG. 2. In certain implementations, the data module 130 may be configurable and operable as a database for storing information for the operation of system 120 and the results produced therefrom.

METHOD: Generally, the system herein is configured to provide an operator a result from the completion of a method including a plurality of steps. In implementations, the method is controlled by an operator or interactive with an operator interface in order to change a step of the method with respect to one or more metrics or properties. The changed step in the method likewise changes the result.

In implementations, the method relates to extracting and displaying a portion of the content stream by the extraction machine and the display machine described hereinabove. More specifically, the method includes extracting phrases from a content stream and displaying visual cues related to and indicating selected properties of the extracted portions the content stream. Further, the method provides an arrangement and organization of the visual cues to permit interactive operator analysis of the content stream. The arrangement and organization of the visual cues may be based on a statistical evaluation of properties of the phrases extracted from the content stream.

The discussion herein will be directed to concept A, concept B, and in certain implementations a concept C, within a content stream. The concepts A-C processed according to the following method provide at least one graphical analysis result that is available for operator manipulation interactively. Thus, each step of the method may be altered by an operator of the system previously described and detailed further hereinbelow. In some implementations certain steps may be excluded, reversed, combined, altered, or combinations thereof as further described herein with respect to the process.

Figure 3:
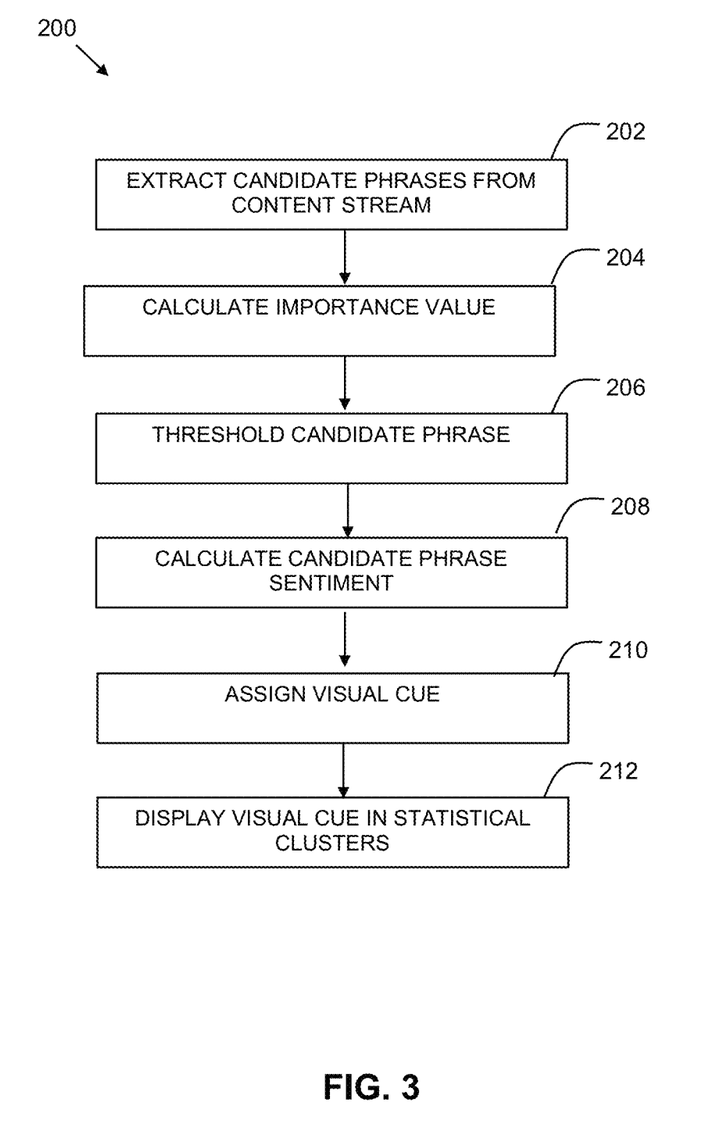
FIG. 3 shows a method in accordance with various examples.

Referring now to FIG. 3, the method 200 for providing an operator with a graphical analysis of a content stream includes the operations of: extracting 202 candidate phrases from a content stream; calculating 204 an importance value of the extracted candidate; thresholding 206 the extracted candidate phases based on the calculated importance value; calculating 208 an average sentiment value for the thresholded candidate phrases; assigning 210 a visual cue to the thresholded candidate phrases; and displaying 212 the visual cue representative of the thresholded candidate phrases in statistical clusters. Generally, the operation of extracting the candidate phrases 202 from the content stream is carried out by the extraction engine 42 in FIG. 1. The remaining operations of calculating 204 an importance value, thresholding 206 the candidate, calculating 208 a sentiment value, assigning 210 a visual cue to, and displaying 212 the visual cue are operations completed by the display engine 44 in the system of FIG. 1.

In implementations, extracting 200 candidate phrases from a content stream by the extraction engine (42, in FIG. 1) utilizes any textual parsing and extracting step configurable for generating candidate phrases. Generally, the candidate phrases are extracted such that they do not cross sentence terminating punctuation, such as a period or an exclamation point. In instances, the candidate phrases are extracted as any number of sequential words within each message of the content stream. In certain implementations, the candidate phrases are extracted as a noun-verb pair, such that the noun-verb pair is arranged in any order and any location within the sentence. In other instances, the candidate phrases are noun-adjective pairs or noun-verb-adverb triplets extracted from the content stream. In further implementations, the candidate phrases are extracted from the content based on the temporal proximity to an event or a predetermined period. Still further, the candidate phrases are extracted from the content stream based on a statistical evaluation of the candidate phrase frequency within the content stream. In implementations, extracting 200 the candidate phrases from a content stream includes one or more of the methods or steps described herein.

In implementations, extracting 200 the candidate phrases includes using an extraction value. In implementations, the extraction value is a co-occurrence frequency for a noun-verb pair, a noun-adjective pair, a noun-verb-adverb triplet, any other words co-occurring therewith, or some combination thereof. The extraction value may be a predetermined or operator controlled threshold for the statistical frequency of co-occurrence. In a non-limiting example, phrases having a noun-verb pair and one or more words with approximately the same or higher statistical frequency of co-occurrence in the content stream are extracted as candidate phrases. Thus, the representative candidate phrases include the noun-verb pair and the at least one other word.

In implementations, the extraction value may be indicative of a concept or concepts within the content stream and the extract candidate phrases. The extraction value includes a term-association complex. Certain candidate phrases having the same or higher statistical frequency of co-occurrence in the content stream as other candidate phrases may be identified as indicative of at least one common concept A. Alternatively, the candidate phrases are identified as indicative of related but not common concepts A, B, C.

Calculating 204 the importance value of the candidate phrases by the display machine (44) of FIG. 1 includes determining the frequency of an extracted candidate phrase in the content stream. More specifically, the more common a candidate phrase is within the content stream, the higher the importance value. In implementations, the content stream for the calculation may be further narrowed to the extracted candidate phrases. Thus, the importance value is the frequency of the candidate phrase occurrence within the total set of extracted candidate phrases. In instances, the importance value is assigned to scale directly with the frequency of the extracted phrase within the content stream. Alternatively, the importance value may be calculated from an algorithm that includes metrics and/or statistics thereof based on the frequency, temporal proximity, the length, other operator defined metrics, or combinations thereof.

In certain implementations, calculating 204 the importance of a candidate phrase includes a word co-occurrence analysis for each of the words in each of the candidate phrases. The word co-occurrence analysis is operated with respect to the frequency of occurrence of the candidate phrase containing the word and the frequency of occurrence of the word in the content stream. The co-occurrence analysis includes a calculation of the probability of the one or more words occurring in the candidate phrase related to a concept A and compared to alternate concepts B or C. Further, the co-occurrences analysis includes determining the probability of all of the words in the phrase co-occurring in relation to the given concept A and compared to alternate concepts B, C.

In further implementations, calculating 204 the importance of a candidate phrase includes a co-occurrence analysis of each of the candidate phrases with respect to other candidate phrases in the same message or within the same temporal distribution. The candidate phrase co-occurrence analysis includes a calculation of the probability of the one or more candidate phrases occurring in the content stream are related to a concept A, in comparison with alternate concepts B or C. Further, the co-occurrences analysis includes determining the probability of the one or more candidate phrases co-occurring in relation to the given concept A and compared to alternate concepts B, C.

Thresholding 206 the candidate phrases includes removing candidate phrases having an importance value below an operator defined threshold or metric. Generally, as the importance value is related to frequency with the words and the candidate phrases co-occur within the content stream, the importance value threshold is a minimum frequency of the words or the candidate phrase within the total number of candidate phrases extracted from the content stream. The thresholding 206 may have any predetermined importance value, such as frequency threshold or importance value between 100% and 0%. In exemplary implementations, the threshold frequency and importance value may be less than about 10%. Thus, all candidate phrases with a frequency and/or importance value of less than about 10% may be excluded or removed from the process 200 at this operation. Alternative implementations may include the candidate phrases with a frequency of less than about 1% are thresholded in the process 200. In certain implementations, a threshold of less than about 0.1% may be utilized. The operation of thresholding 206 may be controllable or alterable by an operator such that different importance values related to frequency of co-occurrence may be provided.

Additionally, as described hereinabove, the importance value may be statistically related to the temporal proximity of the candidate phrase or phrases. Thus, thresholding 206 the candidate phrases includes excluding candidate phrases having a time stamp outside of a temporal range. The temporal range may be any range from or with respect to a time, day, month, year, event, or combinations thereof. Further, the operation of thresholding 206 may be controllable or alterable by an operator such that different importance values related to temporal proximity are utilized in the process 200.

The operation of calculating 208 a candidate phrase sentiment by the display engine (44) in FIG. 1 includes any algorithm for determining the positive, negative, or neutral sentiments from a candidate phrase. In implementations, calculating 208 a candidate phrase sentiment comprises word, phrase, or term-sentiment or -emotion association. Generally, the sentiment value is related to a term-association algorithm. Further, the sentiment value may be calculated by term parsing and co-sentiment analysis of the candidate phrase. Without limitation, the co-sentiment analysis may include analysis of the frequency of co-occurrence of an adjective or adverb with a noun-verb pair. In implementations the sentiment value may be assigned or calculated according to a binary positive (+1) or negative (−1) sentiment value. Alternatively, the sentiment value may be a gradation based on the sentiment analysis and the relative strength of the sentiment determined by the algorithm. Neutral sentiments in candidate phrases are considered negative sentiments in binary sentiment calculations or mildly negative in graded sentiment calculations. In instances, neutral sentiments are afforded no sentiment value. In alternate instances, the neutral sentiments are excluded from further analysis.

Figure 4:
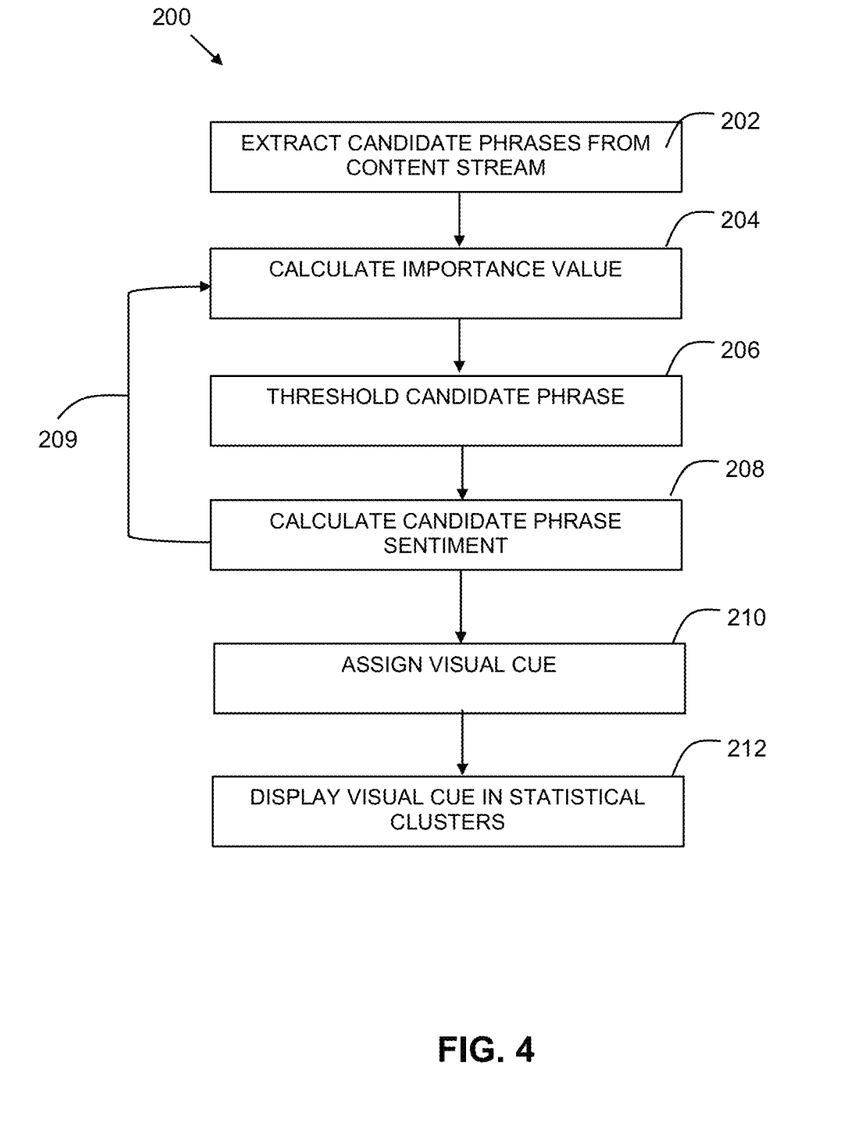
FIG. 4 shows a method in accordance with various examples.

Referring now to FIG. 4, in certain implementations of the disclosed process 200, after calculating 208 the candidate phrase sentiment, there is an operation for re-evaluating 209 the importance of the candidate phrases. In implementations, the re-evaluating 209 the importance includes increasing or decreasing the importance of the candidate phrase based on the candidate phrase sentiment. For example, re-evaluating 209 a candidate phrase with a negative or neutral sentiment includes increasing the importance value of the candidate phrase. Alternatively, the operation of re-evaluating 209 the candidate decreases the importance value of the candidate phrase. For example, a positive sentiment in a candidate phrase may be decreased. Exemplary operations for changing the importance value of the candidate phrase include mathematical factors for additive or subtractive, multiplicative, or scalar alteration of a metric within the operation for calculating 204 the importance algorithm. In further implementations, candidate phrases subject to the operation of re-evaluating 209 the importance may be subject to the operation of thresholding 206 as described hereinabove.

Figure 5:
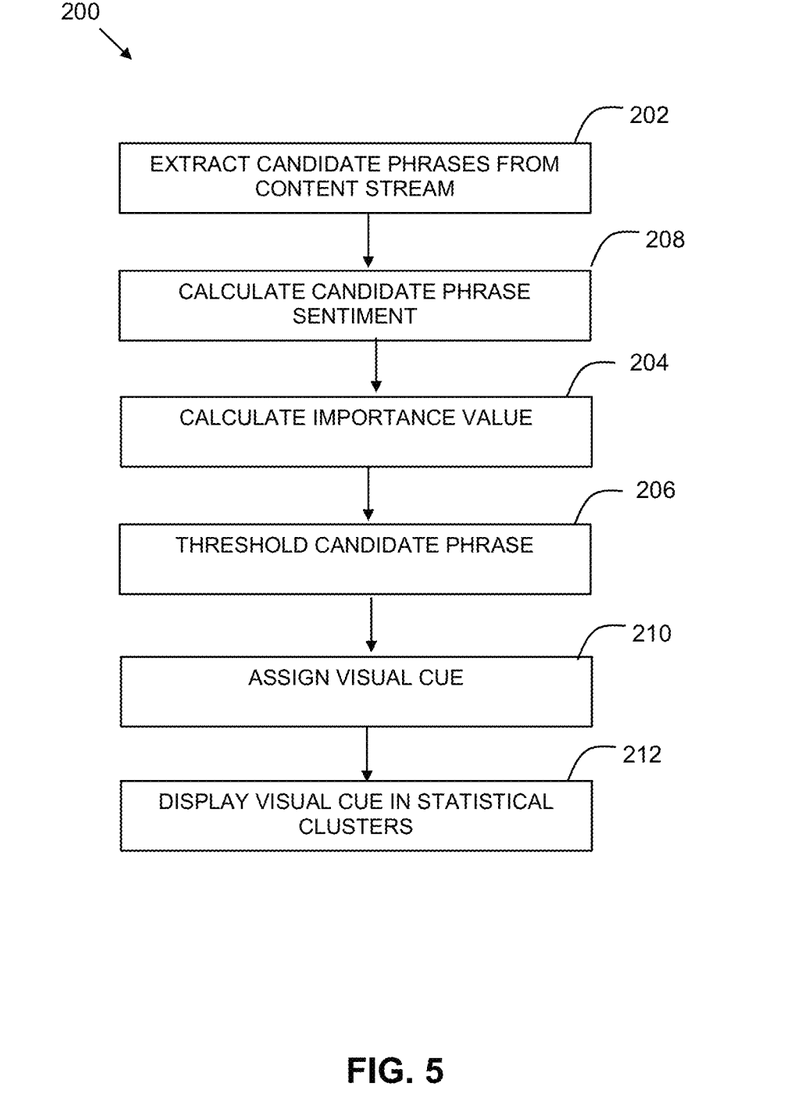
FIG. 5 shows a method in accordance with various examples.

In alternative implementations of the process 200 shown in FIG. 5, calculating 208 the candidate phrase sentiment may precede the operations of calculating 204 the candidate phrase importance value and thresholding 206 the candidate phrases. As described herein certain implementations of calculating 208 the candidate phrase sentiment change the operation for calculating 204 the candidate phrase importance value. Thus, the implementation of the process 200 in FIG. 5 for the display engine 44 of FIG. 1 represents a streamlining of process 200 shown in FIG. 4, such that the re-evaluating 209 operation is optional or precluded.

Referring now to FIGS. 3-5, the operation assigning 210 a visual cue by the display engine (44) of FIG. 1 includes providing a candidate phrase a graphic representation according to a predetermined or alterable metric. In implementations, a candidate phrase may be represented by a textual graphic, a geometrical graphic (i.e., shape), a symbolic graphic, other graphical representations, or combinations thereof. In textual graphic implementations, a candidate phrase is configured as the graphic. Thus, the text of the candidate phrase is assigned or includes font, color, intensity, and combinations thereof as the visual cue without limitation. Further, a visual cue includes an enclosure, such as a box, bubble or other perimeter shape, surrounding a candidate phrase text. The enclosure has shape, size, color, pattern, and combinations thereof without limitation as assigned visual cues indicative of a metric.

As described, assigning 210 a visual cue includes assigning values indicative of the predetermined or alterable metrics according to a gradient. Non-limiting, exemplary metrics include the frequency, the importance, the length, the sentiment, the temporal proximity, and combinations thereof for the candidate phrases. In implementations, the metrics include gradient or graduated values and thus the assigned visual cues are likewise graduated. Exemplary gradations of the visual cues include intensity, brightness, hue, shading, patterns, pattern attenuation or continuity, pattern directionality, and combinations thereof.

Referring still to FIGS. 3-5, the process 200 includes displaying 212 the visual cues in statistical clusters. Displaying 212 the statistical clusters includes any statistical evaluation of the candidate phrases according to the present disclosure. Also, the statistical evaluation of the candidate phrases is displayed 212 according to other statistical algorithms for grouping or associating words, terms, phrases, sentiments, importance, frequency, time, and combinations thereof, without limitation. Exemplary algorithms contain evaluations of the relatedness of the candidate phrases or the co-occurrence of portions of the candidate phrases. In certain implementations, the statistical evaluation includes determining families or genera of correlated candidate phrases. Also, the algorithms for determining statistical clusters include any used for grouping phrases.

Generally, displaying 212 the visual cues includes providing the user a graphical user interface (GUI). The GUI displays to the operator the assigned visual cues in the statistical clusters. In instances, the GUI includes a coordinate system, such as but not limited to a Cartesian system, having more than 2 axes. In certain implementations, the GUI includes a plurality of coordinates or axes, such that statistical clusters maybe oriented thereon. The GUI may provide the operator any coordinate system, grid, or orienting arrangement in which to display the statistical clusters of the visual cues indicative of the candidate phrases. Alternatively, axes in the GUI may not be associated with the organization or arrangement of the statistical clusters.

The GUI includes at least one operator interface for controlling metrics of the process 200 operated by the system 100. The operator interfaces provide the operator with an interactive control of the metrics. Exemplary interfaces include a textual search interface or a scalar interface, such as a slider or a dial. Additionally, a control may comprise of search or input, in order to access the data structure.

In certain instances, the statistical clusters are arranged at or around a candidate phrase origin. The candidate phrase origin may be a candidate phrase having the highest value for a predetermined metric or combination of metrics. Alternatively, the candidate phrase origin for displaying 212 the visual cues in the GUI is operator selected.

Figure 6:
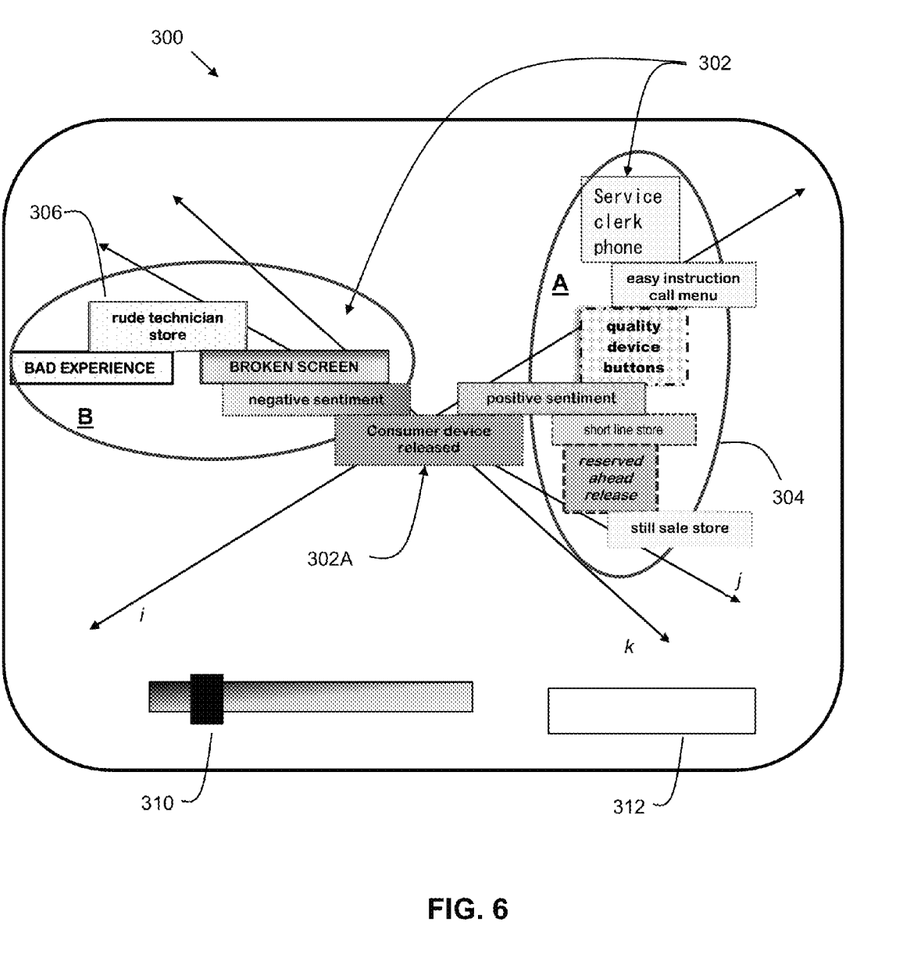
FIG. 6 shows a graphical user interface in accordance with various examples.

Referring to FIG. 6, there is illustrated an exemplary implementation of a GUI 300. The GUI 300 is a graphical display of the candidate phrases provided by the system 100 and the process 200 illustrated in FIGS. 1 through 5. Each candidate phrase 302 has at least one visual cue related to at least one operation or metric of the process 200 as described herein previously. The GUI 300 is shown as is a multi-axis (i, j, k) heat map of the candidate phrases 302 organized in statistically related clusters 304 and 306 based around the candidate phrase origin 302A. The GUI 300 having multiple axis, includes circular maps, three-dimensional maps, or other maps of the candidate phrases. As illustrated for example cluster 304 is related to concept A having a positive sentiment associated therewith. Likewise, a negative sentiment concept B forms cluster 306. In instances, the position of the clusters 304 and 306 are indicative of the concept (A, B) and the candidate phrase origin 302A. Alternatively, the clusters 304 and 306 may be positioned anywhere in the GUI, such that the candidate phrase origin 302A is only an operator determined candidate phrase of interest.

In implementations, the GUI 300 may include an operator manipulatible control 310. The control 310 confers interactivity to the system 100 and the process 200. The control 310 may be located anywhere on the GUI 300 and include any graded or gradual control, such as but not limited to a dial or a slider (as shown). The control 310 is associated with at least one metric or other statistical algorithms for grouping or associating words, terms, phrases, sentiments, importance, frequency, time, and combinations thereof, without limitation. In response to the operator manipulating the control 310 the metric changes such that the process displays another result. Additionally, the at least one visual cue associated with a candidate phrase dynamically changes in response to the operator manipulation of the control 304 and the associated metric. The visual indicator would show an operator at least one change in the font, size, color, intensity, gradation, patterning, and combinations thereof without limitation, within the multi-axis heat map described above. Thus, the control 304 is an input for the system 100 to alter a metric. The GUI 300 includes a search or find interface 312, such that the operator may input or specify a simplified phrase for the system 100 to utilize as a metric for the process 200.

Figure 7:
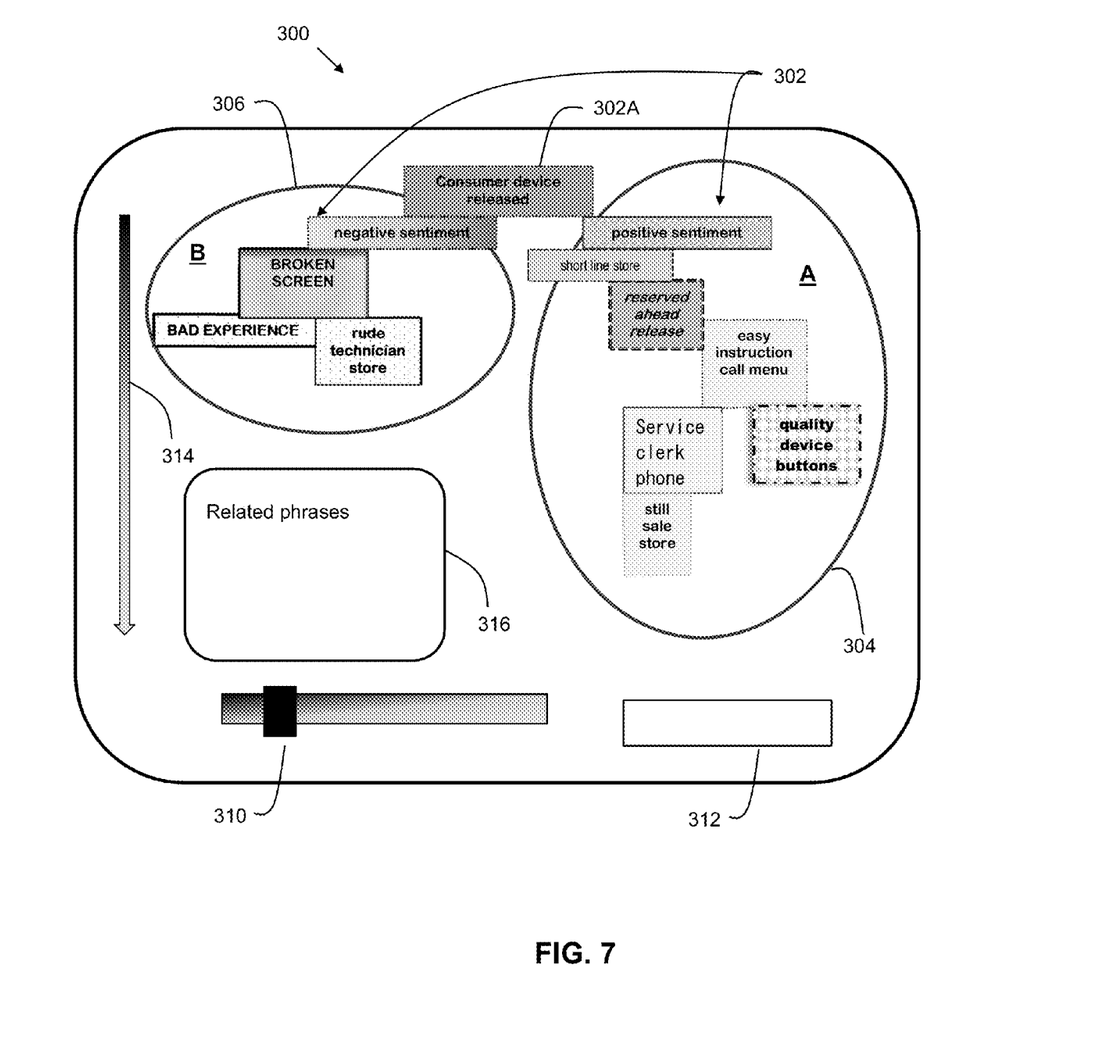
FIG. 7 also shows a graphical user interface in accordance with various examples.

Referring now to FIG. 7, the GUI 300 is illustrated as a tree of candidate phrases. More specifically, clusters 304 and 306 related to positive concept A and negative concept B respectfully share a common origin or original candidate phrase 302A. Directional indicator 314 illustrates the distribution of candidate phrases within the clusters 304 and 306 with respect to some metric. For example if the metric was with respect to time, candidate phrase visual cues 302 are displayed a linear distance along directional indicator 314 from the original candidate phrase 302A according to a temporal distribution. Further, in certain instances, the GUI 300 includes an alternate display 316. Alternate display 316 may be configured to display operator determined information, such as but not limited to related candidate phrases, metrics with respect to candidate phrase statistical calculations, and other information. In further implementations, alternate display may include addition operator alterable metrics as described herein.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method comprising:
   extracting, by a processor, candidate phrases from a content stream;
   calculating, by the processor, an importance value of the extracted candidate phrases based on frequency of the extracted phrases in the content stream;
   thresholding, by the processor, the extracted candidate phases based on the calculated importance value;
   calculating, by the processor, an average sentiment value for the thresholded candidate phrases using term-association;
   assigning, by the processor, a visual cue to the thresholded candidate phrases using the calculated average sentiment value to determine at least one property of the visual cue; and
   graphically displaying, by the processor, the visual cue representative of the thresholded candidate phrases in statistical clusters.

2. The method of claim 1, wherein calculating an importance value of the extracted candidate phrases comprises determining the temporal proximity of the extracted candidate phrases to an event or predetermined period.

3. The method of claim 1, wherein assigning the thresholded candidate phrases a visual cue further comprises using color and color intensity.

4. The method of claim 1, wherein assigning the thresholded candidate phrases a visual cue further comprises using the calculated importance to determine at least one property of the visual cue.

5. The method of claim 1, wherein calculating the average sentiment further comprises altering the calculated importance of the extracted candidate phrases.

6. The method of claim 5, wherein altering the calculated importance comprises increasing the importance of the extracted candidate phrases in response to a negative average sentiment in the thresholded candidate phrases.

7. The method of claim 5, wherein altering the calculated importance of the extracted phrases further comprises re-evaluating the calculated importance.

8. The method of claim 1, wherein graphically displaying the thresholded candidate phrases in statistical clusters comprises grouping thresholded phrases having different visual cues.

9. The method of claim 8, wherein grouping thresholded candidate phrases comprises grouping candidate phrases having a co-occurring concept.

10. A non-transitory, computer-readable storage device containing software that, when executed by a processor, causes the processor to:
    extract candidate phrases from a content stream;
    calculate an importance value of the extracted candidate phrases based on frequency of the extracted phrases in the content stream;
    threshold the extracted candidate phases based on the calculated importance value;
    calculate an average sentiment value for the thresholded candidate phrases using term-association;
    increase the calculated importance value in response to a negative average sentiment in the thresholded candidate phrases;
    assign a visual cue to the thresholded candidate phrases; and
    graphically display the visual cue representative of the thresholded candidate phrases in statistical clusters.

11. The non-transitory, computer-readable storage device of claim 10 wherein the software causes the processor to determine the temporal proximity of the extracted candidate phrases to an event or predetermined period.

12. The non-transitory, computer-readable storage device of claim 10 wherein the software causes the processor to assign the thresholded candidate phrases a visual cue using the calculated importance to determine at least one property of the visual cue.

13. The non-transitory, computer-readable storage device of claim 10 wherein the software causes the processor to assign the thresholded candidate phrases a visual cue using the calculated average sentiment to determine at least one property of the visual cue.

14. The non-transitory, computer-readable storage device of claim 10 wherein the software causes the processor to:
    group thresholded phrases having different visual cues and a co-occurring concept.

15. The non-transitory, computer-readable storage device of claim 14 wherein the software causes the processor to display the grouped statistical cluster according to the co-occurring concept.

16. A system, comprising:
    a memory;
    a processor;
    an extraction engine to extract a set of candidate phrases from a content stream, wherein the candidate phrases have at least two words; and
    an analysis engine to organize the extracted candidate phrases from the content stream based on at least one metric, assign a visual cue based on the least one metric using an average sentiment value to determine at least one property of the visual cue, and display the candidate phrases in statistical groups including the visual cues to an operator;
    wherein the extraction and analysis engines are implemented as a processor executing software.

17. The system of claim 16, wherein the analysis engine calculates the importance of the candidate phrases by co-occurrence as a first metric, and calculates the sentiment of the candidate phrases by term-association as the second metric.

18. The system of claim 17, wherein the analysis engine assigns the candidate phrases a visual cue indicative of importance and sentiment; and displays the candidate phrases to an operator.

* * * * *

UNITED STATES PATENT AND TRADEMARK OFFICE
CERTIFICATE OF CORRECTION

PATENT NO. : 8,972,242 B2  
APPLICATION NO. : 13/563647  
DATED : March 3, 2015  
INVENTOR(S) : Ming C. Hao et al.

Page 1 of 1

It is certified that error appears in the above-identified patent and that said Letters Patent is hereby corrected as shown below:

IN THE CLAIMS:

In column 9, line 39, in Claim 1, delete "phases" and insert -- phrases --, therefor.

In column 10, line 18, in Claim 10, delete "phases" and insert -- phrases --, therefor.

Signed and Sealed this  
Eleventh Day of August, 2015

Michelle K. Lee  
*Director of the United States Patent and Trademark Office*